US008469460B2

(12) United States Patent
Martin, III et al.

(10) Patent No.: US 8,469,460 B2
(45) Date of Patent: Jun. 25, 2013

(54) SPINDLE NUT ASSEMBLY

(75) Inventors: Robert J. Martin, III, Newark, OH (US); Darren L. Booker, Newark, OH (US); Brian D. Hayes, Newark, OH (US)

(73) Assignee: Arvinmeritor Technology, LLC, Troy, MI (US)

( * ) Notice: Subject to any disclaimer, the term of this patent is extended or adjusted under 35 U.S.C. 154(b) by 289 days.

(21) Appl. No.: 12/825,386

(22) Filed: Jun. 29, 2010

(65) Prior Publication Data

US 2011/0316325 A1    Dec. 29, 2011

(51) Int. Cl.
*B60B 27/00*    (2006.01)
*F16B 39/12*    (2006.01)

(52) U.S. Cl.
USPC ............ 301/105.1; 301/124.1; 411/122; 411/267

(58) Field of Classification Search
USPC .. 301/105.1, 111.03, 124.1, 131; 29/894.361; 411/217, 220, 221, 122, 265, 266, 267; 384/544
See application file for complete search history.

(56) References Cited

U.S. PATENT DOCUMENTS

| | | | | |
|---|---|---|---|---|
| 812,299 A * | 2/1906 | Schmitt | ............ | 411/237 |
| 889,319 A * | 6/1908 | Doelp | ............ | 411/268 |
| 1,199,031 A * | 9/1916 | Smith | ............ | 411/231 |
| 1,928,982 A * | 10/1933 | Rosenbaum | ............ | 411/222 |
| 2,967,539 A * | 1/1961 | Bradbury | ............ | 137/246 |
| 3,985,393 A | 10/1976 | Jovick | | |
| 4,812,094 A * | 3/1989 | Grube | ............ | 411/134 |
| 5,154,560 A * | 10/1992 | Copito | ............ | 411/266 |
| 5,618,143 A * | 4/1997 | Cronin et al. | ............ | 411/220 |
| 5,772,373 A * | 6/1998 | Cronin et al. | ............ | 411/120 |
| 6,010,290 A * | 1/2000 | Slesinski et al. | ............ | 411/226 |
| 6,224,167 B1 | 5/2001 | Riley | | |
| 6,533,363 B1 | 3/2003 | Hayes et al. | | |
| 6,695,738 B2 | 2/2004 | Sullivan et al. | | |
| 6,719,028 B2 | 4/2004 | D'Amico et al. | | |
| 6,935,788 B2 | 8/2005 | Stanczak | | |
| 7,000,995 B2 * | 2/2006 | Hagelthorn | ............ | 301/105.1 |
| 7,547,077 B2 * | 6/2009 | Melberg et al. | ............ | 301/108.1 |
| 7,708,509 B1 * | 5/2010 | Bennett | ............ | 411/95 |
| 7,927,052 B1 * | 4/2011 | Varden | ............ | 411/221 |
| 2010/0181739 A1 | 7/2010 | Eschenburg et al. | | |

FOREIGN PATENT DOCUMENTS

EP    1234690    8/2002
JP    2000329122 A * 11/2000

* cited by examiner

*Primary Examiner* — Kip T Kotter
(74) *Attorney, Agent, or Firm* — Brooks Kushman P.C.

(57) ABSTRACT

A spindle nut assembly includes inner and outer nuts having corresponding beveled surfaces. The inner nut is tightly threaded onto an end of a spindle and is positioned to achieve a desired endplay setting. The outer nut contacts the inner nut at an oblique angle via the beveled surfaces, which squeezes the inner nut more tightly onto the spindle while still maintaining the desired endplay setting.

36 Claims, 5 Drawing Sheets

SPINDLE NUT ASSEMBLY

TECHNICAL FIELD

This invention generally relates to spindle nut assembly that can be precisely set to maintain a desired bearing endplay.

BACKGROUND OF THE INVENTION

Wheel ends include a hub that is supported by wheel bearings for rotation on a spindle. A spindle nut pack is installed onto an end of the spindle and is adjusted as needed to provide a desired bearing end play amount which is typically within a range of 0.001 inches to 0.005 inches.

A conventional spindle nut pack includes an inner nut that is threaded onto the spindle end and abuts against an outer wheel bearing. An inner lock washer and bendable lock washer are installed onto the spindle end with the inner lock washer abutting against the inner nut. Finally, an outer jam nut is then jammed onto the inner nut. The bendable lock washer and jam nut are used for safety reasons to provide redundancy for retaining the inner nut on the spindle.

This traditional configuration is inexpensive and easy to install; however, it is difficult to precisely and consistently set a desired bearing end play. The inability to maintain the desired level of precision is due to the action of jamming the outer nut onto the inner nut, which moves the inner nut from its initial position to a position that is at an opposite flank of the respective threads of the threaded connection.

A single-nut configuration has been used to improve precision; however, these nuts are expensive and forfeit the safety redundancy of the conventional spindle nut pack. While the single-nut configuration is an improvement over the conventional spindle nut pack with regard to precision, distribution comparisons have shown that there are still a statistically significant number of installations that fall outside the desired limits. As such, both the conventional spindle nut pack and the single-nut configuration still require 100% auditing of endplay settings, which is time consuming and increases cost.

SUMMARY OF THE INVENTION

A spindle nut assembly includes inner and outer nuts having corresponding beveled surfaces. The inner nut is threaded onto an end of a spindle and is positioned to achieve a desired endplay setting. The outer nut contacts the inner nut at an oblique angle via the beveled surfaces, which squeezes the inner nut more tightly onto the spindle while still maintaining the desired endplay setting.

In one example, the inner nut comprises a beam-style nut including a plurality of flexible beam elements. Each beam element is spaced apart from an adjacent beam element by a slot. The beveled surface of the inner nut is provided on an outer peripheral surface of the beam elements. A corresponding beveled surface is formed as part of the inner peripheral surface of the outer nut. The beam elements of the inner nut include a threaded portion that fits tightly onto corresponding spindle threads.

In one example, the spindle nut assembly is utilized in a wheel end where a hub is supported for rotation relative to the spindle on inboard and outboard bearings. In one example, the spindle nut assembly includes an inner washer that is positioned to abut against the outboard bearing. A bend tab washer is then positioned immediately outboard of the inner washer. Both the inner and bend tab washers include tabs that are received within a slot formed within the spindle. The inner washer is then threaded onto the spindle to abut against the bend tab washer to seat the bearings. The inner nut is subsequently backed off to achieve the desired endplay setting. Then the outer nut is jammed on the inner nut to tighten the inner nut to the spindle without adversely affecting the desired endplay setting. Finally, an elongated tab on the bend tab washer is bent around an outboard end face of the outer nut to securely hold the assembly in place.

These and other features of the present invention can be best understood from the following specification and drawings, the following of which is a brief description.

DETAILED DESCRIPTION OF THE PREFERRED EMBODIMENT

Figure 1:
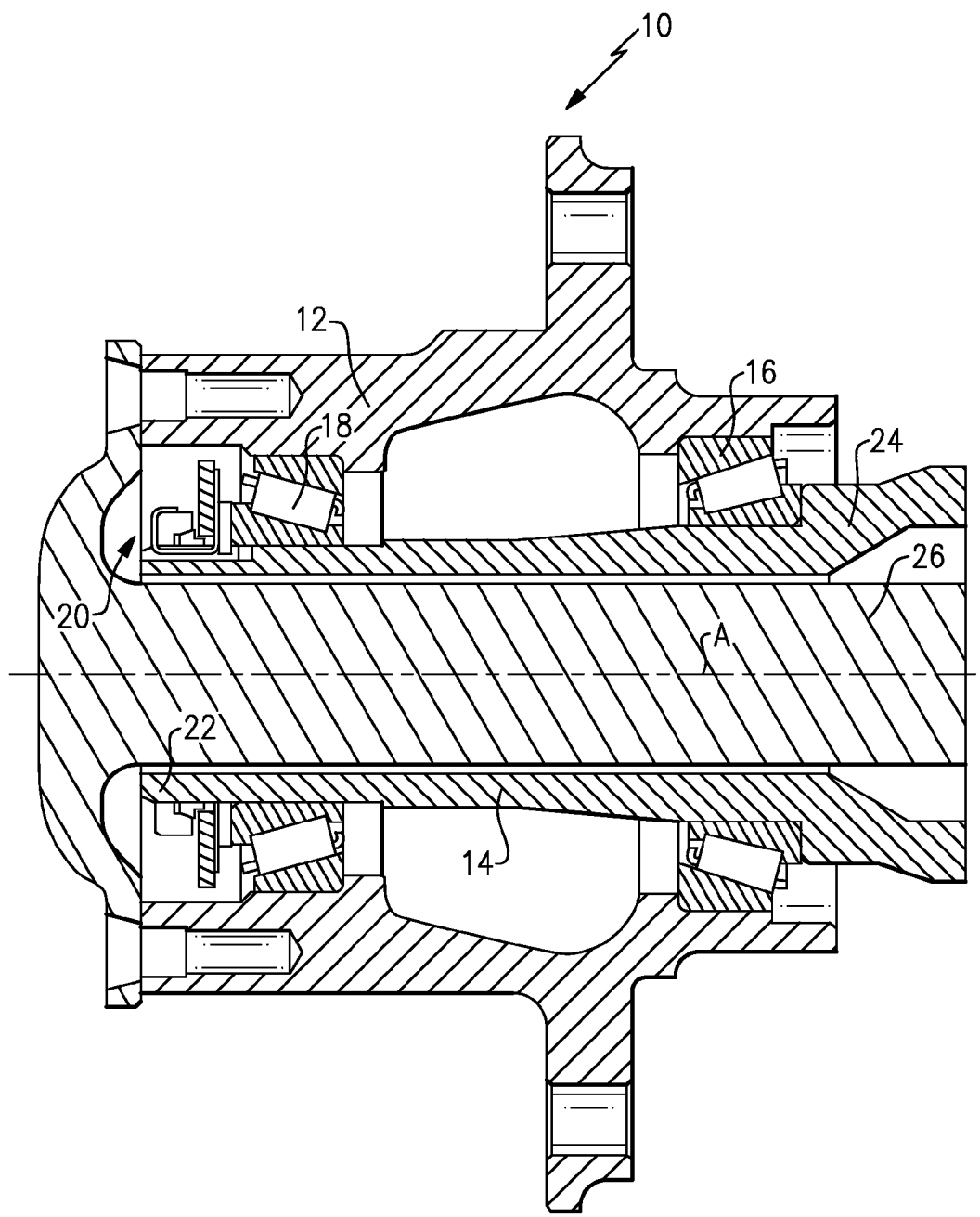
FIG. 1 is a schematic representation of a wheel end including a spindle nut assembly and a hub supported for rotation relative to a spindle on a pair of bearings.

A wheel end 10 includes a hub 12 that is supported for rotation about an axis A relative to a spindle 14 on inboard 16 and outboard 18 wheel bearings. A spindle nut assembly, shown schematically at 20, is threaded onto an outboard end 22 of the spindle 14 and is positioned to provide a desired endplay setting. In the example shown, the spindle 14 is associated with a drive axle 24 having an axle shaft 26 coupled to drive the hub 12; however, the spindle nut assembly 20 could be utilized with other types of wheel end configurations. Additionally, the nut assembly could be used in non-wheel applications where appropriate.

Figure 2:
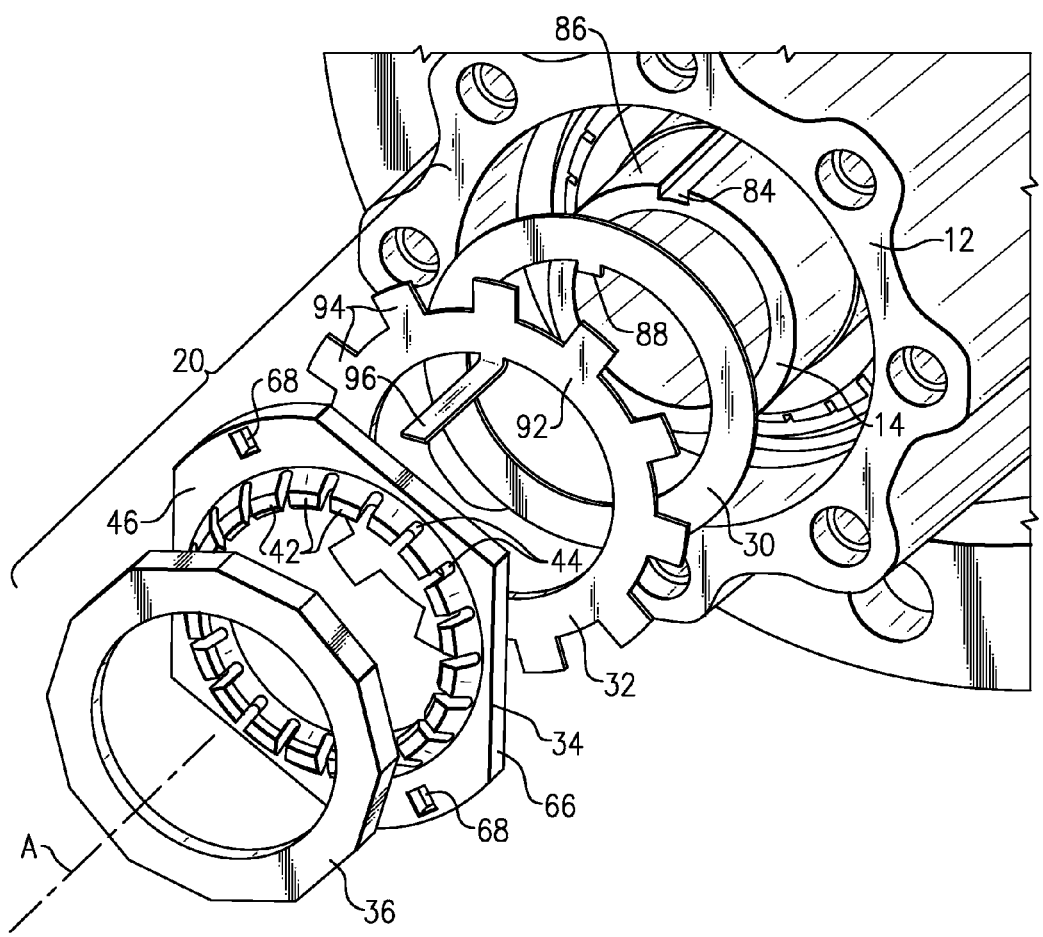
FIG. 2 is an exploded view of the spindle nut assembly.

As shown in FIG. 2, the spindle nut assembly 20 includes an inner washer 30 abutting against the outboard wheel bearing 18, a bend tab washer 32 positioned outboard of the inner washer 30, an inner nut 34 positioned outboard of the bend tab washer 32, and an outer nut 36 positioned immediately outboard of the inner nut 34. The inner nut 34, which has nut threads formed on an inner peripheral surface, is threaded onto the outboard end 22 of the spindle 14, which has corresponding spindle threads. The inner nut 34 and the outer nut 36 include obliquely orientated abutting contact surfaces that cooperate with each other to jam the inner 34 and outer 36 nuts together and tighten the inner nut 34 to the spindle 14. When the inner nut's threads fit tightly into the corresponding spindle threads a desired bearing endplay setting can be achieved. The interaction of the jamming of the outer and inner nuts does not adversely affect the desired bearing endplay setting.

In one example, the inner nut 34 comprises a beam-style nut having a plurality of discrete beam elements 42 circumferentially spaced apart from each other about the axis A.

Each beam element 42 is spaced apart from an adjacent beam element 42 by a slot 44. The series of slots 44 allow the individual elements 42 to act as beams or springs that keep the slightly undersized nut threads positioned into the "valley" of the spindle threads. Optionally, the beam elements could be replaced by a solid ring-like portion as long as this portion has sufficient flexibility.

Figure 3A:
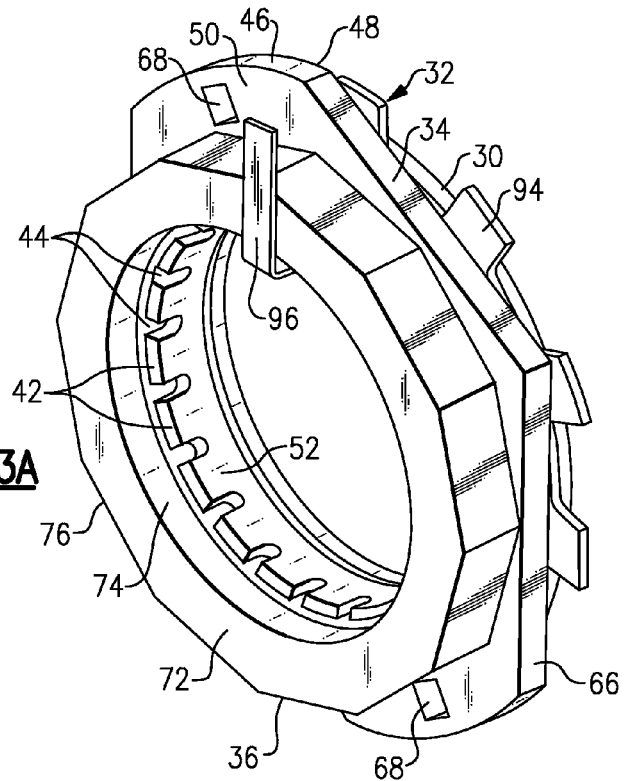
FIG. 3A is perspective view of the spindle nut assembly as assembled.
Figure 3B:
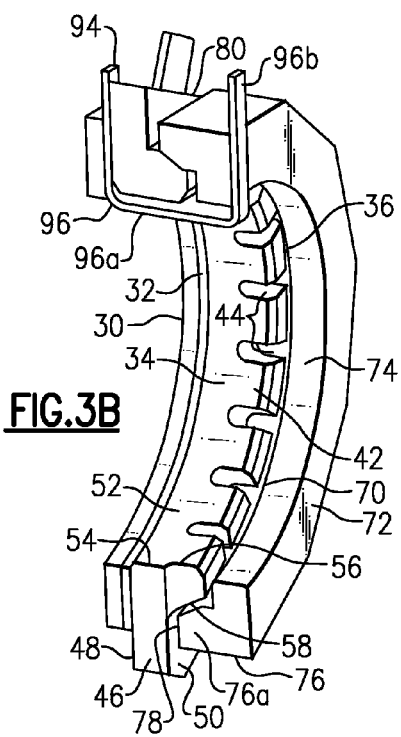
FIG. 3B is a perspective cross-sectional view through the spindle nut assembly.

As shown in FIGS. 3A and 3B, the inner nut 34 includes an outer peripheral flange portion 46 having an inboard surface 48 and an outboard surface 50. The flange portion 46 extends in a direction radially outwardly from the axis A. A transversely extending portion 52 extends in an outboard direction along the axis A from an inner periphery of the flange portion 46. The transversely extending portion 52 includes the series of beam elements 42 and slots 44. An inner peripheral surface 54 of the inner nut 34 includes the nut threads. The beam elements 42 extend substantially in an axial direction along the axis A and include an inner peripheral surface 56 and an outer peripheral surface 58.

Figure 4:
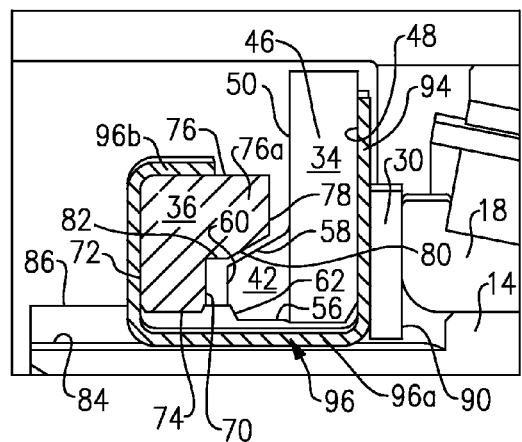
FIG. 4 is a magnified cross-sectional view of the spindle nut assembly as installed in the wheel end.
Figure 5:
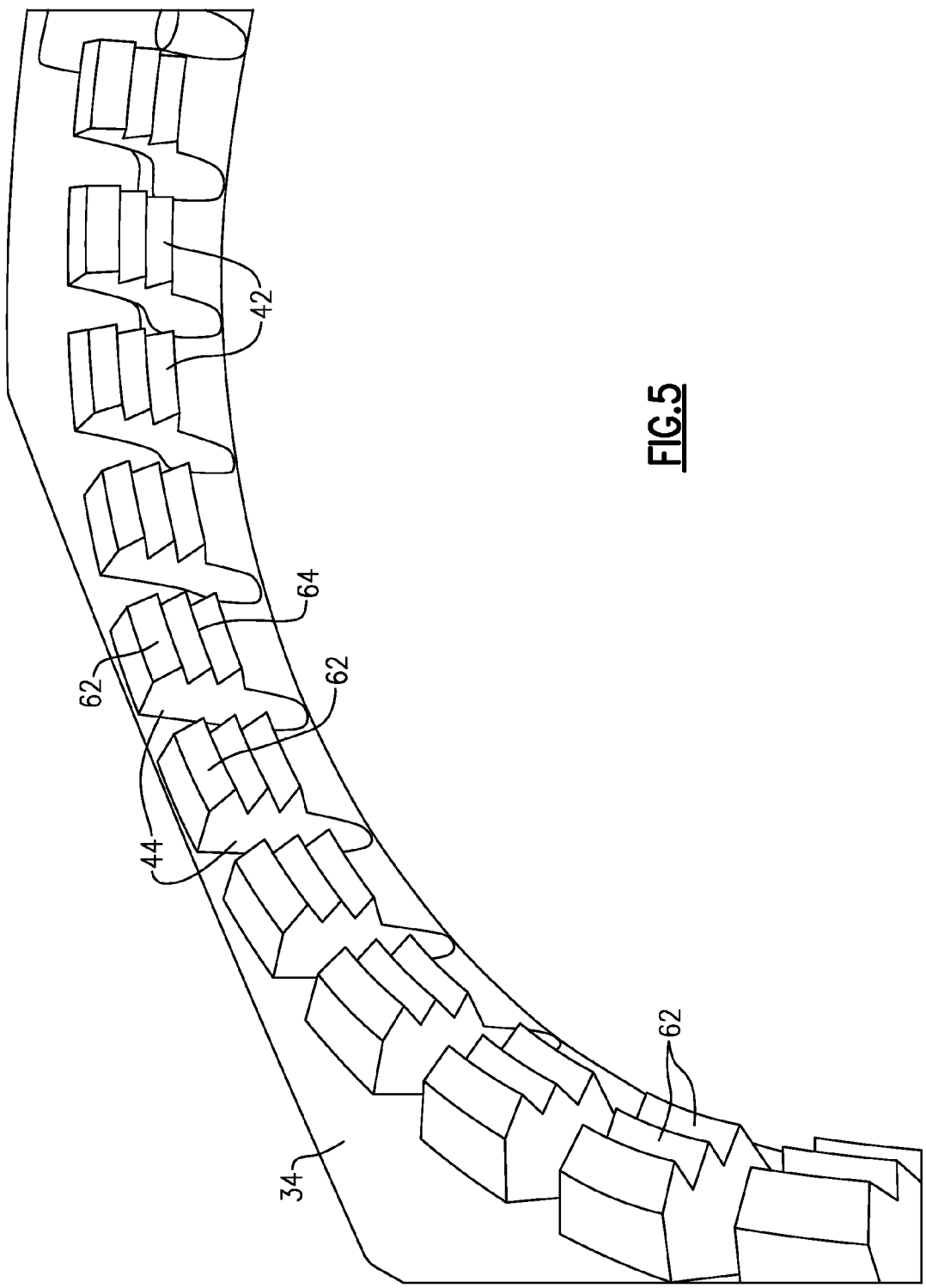
FIG. 5 is an enlarged view of an inner nut from the spindle nut assembly.

As best shown in FIG. 4, the outer peripheral surface 58 of each beam element 42 comprises a first bevel surface, i.e. comprises a surface that is obliquely orientated relative to the axis A. This oblique surface extends from the outboard surface 50 of the flange portion 46 to an outboard edge of the beam element 42. In one example, the beveled surface of each beam element 42 transitions into a distal end face 60 that extends generally perpendicular to the axis A. The distal end face 60 then transitions into the inner peripheral surface 56 of the respective beam element 42. The inner peripheral surface 56 includes an obliquely orientated transition surface 62 that transitions from the end face 60 into the inner peripheral surface 56 The inner peripheral surface includes a threaded portion 64 as shown in FIG. 5. This threaded portion 64 is tightly threaded onto the corresponding spindle threads. Threads that form the threaded portion 64 are not shown in FIGS. 3A-4 for purposes of clarity.

The flange portion 46 has an outer peripheral edge 66 comprised of a plurality of flats which provide a gripping engagement surface for an installation tool. The flange portion 46 also includes at least one wrenching hole 68 that is used to keep the inner nut 34 from rotating during installation of the outer nut 36.

The outer nut 36 has an inboard surface 70, an outboard surface 72, an inner peripheral surface 74, and an outer peripheral surface 76. As shown in FIG. 3A, the outer nut 36 includes a plurality of flats on the outer peripheral surface 76 that extend from the outboard surface 72 to the inboard surface 70. The inner peripheral surface 74 comprises a threaded portion that is threaded onto corresponding spindle threads. A lip portion 76a is formed near the outer peripheral surface 76 and extends in an inboard direction generally along the axis A from the inboard surface 70. The lip portion 76a includes the outer peripheral surface 76 which extends to a distal end 78 of the lip portion 76a. In the example shown, the distal end surface 78 extends in a direction that is generally perpendicular to the axis A. The distal end surface 78 then transitions into the inner peripheral surface 74. The inner peripheral surface 74 includes a second bevel surface 80 that faces the first bevel surface formed on the outer peripheral surface 58 of the beam elements 42 of the inner nut 34. The second bevel surface 80 then transitions into an axial surface 82 that extends back to the inboard surface 70. The remaining portion of the inner peripheral surface 74 extends in an axial direction and is received over the spindle 14.

Figure 6:
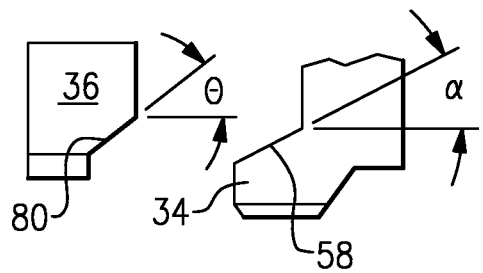
FIG. 6 shows one example of bevel angles for inner and outer nuts of the spindle nut assembly.
Figure 7A:
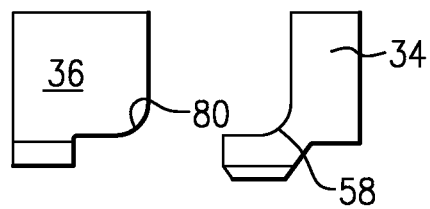
FIG. 7A shows one example of a non-linear bevel surface
Figure 7B:
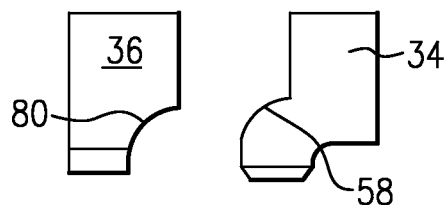
FIG. 7B shows another example of a non-linear bevel surface.

The second bevel surface 80 is obliquely orientated relative to the axis A and can generally correspond to the first bevel surface. The first 58 and second 80 bevel surfaces are defined by first α and second θ bevel angles. These angles can be the same as each other or can be different from each other as shown in FIG. 6. Further, these surfaces 58, 80 can be linear surfaces as shown in FIG. 6 or non-linear surfaces as shown in FIGS. 7A and 7B.

The outer nut 36 operates on the inner nut 34 via abutting contact between the beveled surfaces to both jam the nuts 34, 36 together. As the threaded portion of the inner peripheral surface 74 is threaded onto the corresponding spindle threads, the second bevel surface is forced against the first bevel surface to press the inner nut 34 more tightly into the spindle threads. Specifically, this contact drives the threads of the inner nut 34 harder into the valley of the threads on the spindle 14, which maintains the initial axial position of the inner nut 34, i.e. the desired endplay setting is not adversely affected during installation of the outer nut 36.

As shown in FIG. 2, the spindle 14 includes a keyway slot 84 formed within an outer peripheral surface 86 of the spindle 14. The outer peripheral surface 86 includes a threaded portion for attaching the inner and outer nuts as described above. The inner washer 30 includes a radially inwardly extending protrusion or tab 88 that is received within the keyway slot 84 as the inner washer 30 is slid over the outer peripheral surface 86 of the spindle 14. The inner washer 30 is slid along the spindle 14 until an inboard surface 90 of the inner washer 30 abuts directly against the outboard wheel bearing 18.

The bend tab washer 32 comprises a ring-shaped body 92 with a plurality of tabs 94 circumferentially spaced apart from each other about the axis A. The tabs 94 extend outwardly in a radial direction relative to the axis A. The bend tab washer 32 includes at least one elongated bendable tab 96 that initially extends in an axial outboard direction along the axis A. The elongated bendable tab 96 is aligned in the radial direction with one of the plurality of radially extending tabs 94. The elongated bendable tab 96 includes an axially extending portion 96a that is received within the keyway slot 84 of the spindle 14. After installation of the inner 34 and outer 36 nuts, a distal end portion 96b of the elongated bendable tab 96 is bent upwardly to extend across the outboard surface 72 and over the outer peripheral surface 76 of the outer nut 36. The inner 34 and outer 36 nuts are then directly sandwiched between the distal end portion 96b of the elongated bendable tab 96 and the corresponding radially extending tab 94. This prevents rotation of the inner 34 and outer 36 nuts after installation. Further, at least one tab 94 is bent over one flat portion of outer edge 66 to provide an additional anti-rotation feature.

In one example, the spindle nut assembly 20 has the following assembly sequence. The hub 12 and outboard wheel bearing 18 are installed per conventional practice. Next, the inner washer 30 is installed on the outboard end 22 of the spindle 14 by sliding the tab 88 into the keyway slot 84 until the washer 30 abuts against the outboard wheel bearing 18. Next, the bend tab washer 32 is installed on the outboard end 22 of the spindle 14 to abut against the inner washer 30. The elongated bendable tab 96 is allowed to bend such that a portion of the tab is held within the keyway slot 84. The next step includes threading the inner nut 34 onto mating threads on the outboard end 22 of the spindle 14 and tightening to a torque level sufficient to seat bearing rollers of the inboard 16 and outboard 18 bearings while rotating the hub 12. Then the inner nut 34 is backed off by a predetermined amount to achieve the desired bearing endplay setting. The outer nut 36 is then installed and tightened using the wrenching holes of the inner nut 34 to keep the inner nut 34 from turning. Then the elongated bendable tab 96 is bent upwardly from the keyway slot 84, across the outboard surface 72 of the outer nut 36, and over the outer peripheral surface 76 of the outer nut 36.

The subject spindle nut assembly 20 utilizes materials and heat treat similar to those traditionally used in the multi-piece design and therefore has a generally similar cost, although the cost may be slightly reduced because the inner nut no longer directly abuts against the outer wheel bearing and thus does not need to be hardened. Further, by using the "beam-style" inner nut, the lateral play in the mating threads of the nut to the spindle is reduced to virtually zero. Also, because of the prevailing torque required to perform this operation, the setting of endplay can be accomplished at lighter torque levels with good precision. The jamming of the inner nut into position is accomplished with the outer nut that provides contact with the inner nut at an oblique angle/beveled interface such that increasing jamming torque merely squeezes the mating threads more firmly into place without significantly changing the lateral/axial position of the inner nut. The same level of redundancy of a traditional configuration is also provided by the use of the inner and bend tab washers.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A spindle nut assembly comprising:
   an inner nut adapted to be tightly threaded onto a spindle, the inner nut having a first bevel surface and being located at a desired bearing endplay setting, wherein the inner nut has an outer peripheral flange portion with an inboard surface and an outboard surface, and wherein the inner nut includes a plurality of beam elements extending outwardly relative to the outboard surface, and wherein the first bevel surface extends from the outboard surface of the flange portion to an outboard edge of each of the beam elements; and
   an outer nut having a second bevel surface that abuts against the first bevel surface to jam the inner and outer nuts together and tighten the inner nut to the spindle while maintaining the desired bearing endplay setting.

2. The spindle nut assembly according to claim 1 including an inner washer having a locating feature that is to be received within a corresponding locating feature on the spindle.

3. The spindle nut assembly according to claim 2 including a bend tab washer having a central tab to be located within the corresponding locating feature on the spindle wherein the inner washer is inboard of the bend tab washer.

4. The spindle nut assembly according to claim 3 wherein the inner nut is positioned outboard of the bend tab washer.

5. The spindle nut assembly according to claim 4 wherein the central tab extends to a bendable distal end that is bent to extend upwardly over an outboard face of the outer nut such that one portion of the bend tab washer engages an inboard face of the inner nut and the distal end of the central tab engages the outboard face of the outer nut.

6. The spindle nut assembly according to claim 1 wherein the plurality of beam elements are circumferentially spaced apart from each other with each beam element being spaced apart from an adjacent beam element by a slot.

7. The spindle nut assembly according to claim 6 wherein the first bevel surface is provided on an outer peripheral surface of each beam element.

8. The spindle nut assembly according to claim 7 wherein the second bevel surface is provided on an inner peripheral surface of the outer nut.

9. The spindle nut assembly according to claim 6 wherein one or more beam elements include a threaded portion formed on an inner peripheral surface that is tightly threaded onto the spindle.

10. The spindle nut assembly according to claim 1 wherein the first bevel surface is defined by a first bevel angle and the second bevel surface is defined by a second bevel angle that is different than the first bevel angle.

11. The spindle nut assembly according to claim 10 wherein at least one of the first bevel surface and the second bevel surface is defined by a non-linear profile.

12. The spindle nut assembly according to claim 1 wherein the inner nut is configured to be held fixed against rotation as the outer nut is rotated against the inner nut.

13. The spindle nut assembly according to claim 1 wherein the inner nut is tightened radially inwardly without rotating when the second bevel surface contacts the first bevel surface.

14. The spindle nut assembly according to claim 1 wherein the outer nut defines a center axis of rotation, and wherein a distal end face of the beam elements extends generally perpendicular to the axis, and including an obliquely orientated transition surface that transitions from the distal end faces to a threaded surface formed on an inner peripheral surface of the beam elements.

15. The spindle nut assembly according to claim 1 wherein the outer nut has an outboard face and an inboard face, and wherein the outer nut includes an outer peripheral edge with a plurality of flats that extend from the outboard face to the inboard face.

16. The spindle nut assembly according to claim 1 wherein the outer peripheral flange portion includes at least one anti-rotation feature adapted to receive a tool to keep the inner nut from rotating during installation of the outer nut.

17. The spindle nut assembly according to claim 16 wherein the at least one anti-rotation feature comprises a hole formed within an outboard face of the outer peripheral flange portion.

18. A wheel end assembly comprising:
    a spindle;
    inboard and outboard wheel bearings mounted on the spindle;
    a hub supported on the inboard and outboard wheel bearings for rotation relative to the spindle;
    an inner washer abutting against the outboard wheel bearing;
    a bend tab washer positioned outboard of the inner washer;
    an inner nut positioned outboard of the bend tab washer and threaded tightly onto the spindle to achieve a desired bearing endplay setting, wherein the inner nut includes a first bevel surface, and wherein the inner nut has an outer peripheral flange portion with an inboard surface and an outboard surface, and wherein the inner nut includes a plurality of beam elements extending outwardly relative to the outboard surface, and wherein the first bevel surface extends from the outboard surface of the flange portion to an outboard edge of each of the beam elements; and
    an outer nut positioned outboard of the inner nut and having a second bevel surface that abuts against the first bevel surface to jam the inner and outer nuts together and further tighten the inner nut to the spindle while maintaining the desired bearing endplay setting, wherein the outer nut rotates about an axis, and wherein the inner nut is configured to be held fixed against rotation as the outer nut is rotated against the inner nut such that the inner nut is tightened radially inwardly without rotating when the second bevel surface contacts the first bevel surface.

19. The wheel end assembly according to claim 18 wherein the plurality of beam elements are circumferentially spaced apart from each other, with each beam element being spaced apart from an adjacent beam element by a slot.

20. The wheel end assembly according to claim 19 wherein the first bevel surface is provided on an outer peripheral surface of each beam element and wherein the second bevel surface is provided on an inner peripheral surface of the outer nut.

21. The wheel end assembly according to claim 18 wherein the spindle includes a keyway and wherein the inner washer includes a protrusion that is received within the slot.

22. The wheel end assembly according to claim 21 wherein the bend tab washer includes a plurality of tabs circumferentially spaced apart from each other and extending outwardly in a radial direction, and wherein the bend tab washer includes at least one elongated bendable tab radially aligned with one of the plurality of tabs, the elongated bendable tab comprising an axially extending portion received within the slot of the spindle with a distal end of the elongated bendable tab being bent upwardly to extend across an outboard end face of the outer nut.

23. The wheel end assembly according to claim 18 wherein a distal end face of the beam elements extends generally perpendicular to the axis, and including an obliquely orientated transition surface that transitions from the distal end faces to a threaded surface formed on an inner peripheral surface of the beam elements.

24. The wheel end assembly according to claim 18 wherein the outer nut has an outboard face and an inboard face, and wherein the outer nut includes an outer peripheral edge with a plurality of flats that extend from the outboard face to the inboard face.

25. The wheel end assembly according to claim 18 wherein the outer peripheral flange portion includes at least one wrenching hole adapted to receive a tool to keep the inner nut from rotating during installation of the outer nut.

26. A method of assembling a spindle nut assembly comprising the steps of:
(a) supporting a hub on at least one bearing for rotation relative to a spindle about an axis;
(b) installing an inner washer on one end of the spindle to abut against the at least one bearing;
(c) installing a bend tab washer on the end of the spindle to abut against the inner washer;
(d) threading an inner nut onto mating threads on the end of the spindle and tightening to a torque level sufficient to seat the at least one bearing, the inner nut having a first bevel surface, wherein the inner nut has an outer peripheral flange portion with an inboard surface and an outboard surface, and wherein the inner nut includes a plurality of beam elements extending outwardly relative to the outboard surface, and wherein the first bevel surface extends from the outboard surface of the flange portion to an outboard edge of each of the beam elements;
(e) backing the inner nut off to achieve a desired bearing endplay setting; and
(f) installing an outer nut onto the inner nut, the outer nut having a second bevel surface in abutting engagement with the first bevel surface, and tightening the outer nut against the inner nut to securely hold the inner nut in place while still maintaining the desired bearing endplay setting.

27. The method according to claim 26 wherein the inner washer includes a protrusion and wherein step (b) includes inserting the protrusion into a keyway formed within the spindle.

28. The method according to claim 27 wherein the bend tab washer includes a plurality of tabs circumferentially spaced apart from each other and extending outwardly in a radial direction, and wherein the bend tab washer includes at least one elongated bendable tab radially aligned with one of the plurality of tabs, and wherein step (c) includes bending a first portion of the elongated bendable tab to extend in an axial direction, the first portion being received within the slot in the spindle, and including:
(g) bending second portion of the elongated bendable tab upwardly across an outboard surface of the outer nut.

29. The method according to claim 28 wherein steps (a) through (g) are performed in successive order.

30. The method according claim 28 wherein steps (a) through (g) are performed in successive order, and wherein step (f) includes tightening the inner nut radially inwardly without rotating the inner nut in response to rotating the outer nut.

31. The method according to claim 26 wherein step (f) includes holding the inner nut against rotation and tightening the outer nut against the inner nut.

32. The method according to claim 26 wherein the outer nut has an outboard face and an inboard face, and including providing the outer nut with an outer peripheral edge having a plurality of flats that extend from the outboard face to the inboard face.

33. The method according to claim 26 wherein the outer peripheral flange portion includes at least one wrenching hole, and including inserting a tool into the wrenching hole to keep the inner nut from rotating during installation of the outer nut.

34. A method of assembling a spindle nut assembly comprising the steps of:
(a) supporting a hub on at least one bearing for rotation relative to a spindle;
(b) installing an inner washer on one end of the spindle to abut against the at least one bearing;
(c) installing a bend tab washer on the end of the spindle to abut against the inner washer;
(d) threading an inner out onto mating threads on the end of the spindle and tightening to a torque level sufficient to seat the at least one bearing, the inner nut having a first bevel surface;
(e) backing the inner nut off to achieve a desired bearing endplay setting; and
(f) installing an outer nut onto the inner nut, the outer nut having a second bevel surface in abutting engagement with the first bevel surface, and tightening the outer nut against the inner nut to securely hold the inner nut in place while still maintaining the desired bearing endplay setting, wherein the outer nut has an outer peripheral surface and an inner peripheral surface, and wherein the inner peripheral surface includes a threaded surface and the second bevel surface that are separated from each other by an axial surface, and with the second bevel surface comprising a surface that extends obliquely inwardly from an inboard end face of the outer nut to the axial surface.

35. A spindle nut assembly comprising:
an inner nut adapted to be tightly threaded onto a spindle, the inner nut having a first bevel surface and being located at a desired bearing endplay setting; and an outer nut having a second bevel surface that abuts against the first bevel surface to jam the inner and outer nuts together and tighten the inner nut to the spindle while maintaining the desired bearing endplay setting, and wherein the outer nut has an outer peripheral surface and an inner peripheral surface, and wherein the inner peripheral surface includes a threaded surface and the second bevel surface that are separated from each other by an axial surface, and with the second bevel surface comprising a surface that extends obliquely inwardly from an inboard end face of the outer nut to the axial surface.

36. A wheel end assembly comprising:

a spindle:

inboard and outboard wheel bearings mounted on the spindle;

a hub supported on the inboard and outboard wheel bearings for rotation relative to the spindle;

an inner washer abutting against the outboard wheel bearing;

a bend tab washer positioned outboard of the inner washer;

an inner nut positioned outboard of the bend tab washer and threaded tightly onto the spindle to achieve a desired bearing endplay setting, wherein the inner nut includes a first bevel surface; and an outer nut positioned outboard of the inner nut and having a second bevel surface that abuts against the first bevel surface to jam the inner and outer nuts together and further tighten the inner nut to the spindle while maintaining the desired bearing endplay setting, wherein the outer nut rotates about an axis, and wherein the inner nut is configured to be held fixed against rotation as the outer nut is rotated against the inner nut such that the inner nut is tightened radially inwardly without rotating when the second bevel surface contacts the first bevel surface, and wherein the outer nut has an outer peripheral surface and an inner peripheral surface, and wherein the inner peripheral surface includes a threaded surface and the second bevel surface that are separated from each other by an axial surface, and with the second bevel surface comprising a surface that extends obliquely inwardly from an inboard end face of the outer nut to the axial surface.

* * * * *

UNITED STATES PATENT AND TRADEMARK OFFICE
CERTIFICATE OF CORRECTION

PATENT NO. : 8,469,460 B2  
APPLICATION NO. : 12/825386  
DATED : June 25, 2013  
INVENTOR(S) : Robert Martin, III et al.

It is certified that error appears in the above-identified patent and that said Letters Patent is hereby corrected as shown below:

In the Claims

Column 8, Line 45, Claim 34:

After "threading an inner"  
Delete "out" and insert -- nut --.

Signed and Sealed this  
Thirty-first Day of December, 2013

Margaret A. Focarino  
*Commissioner for Patents of the United States Patent and Trademark Office*